United States Patent
Trombley

(10) Patent No.: US 9,626,867 B2
(45) Date of Patent: Apr. 18, 2017

(54) FALSE WARNING SUPPRESSION IN A COLLISION AVOIDANCE SYSTEM

(75) Inventor: Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 13/551,754

(22) Filed: Jul. 18, 2012

(65) Prior Publication Data

US 2014/0025285 A1    Jan. 23, 2014

(51) Int. Cl.

| G08G 1/16 | (2006.01) |
|---|---|
| G01S 5/00 | (2006.01) |
| G01S 7/40 | (2006.01) |
| G01S 13/93 | (2006.01) |
| G01S 17/93 | (2006.01) |
| G01S 13/86 | (2006.01) |

(52) U.S. Cl.
CPC ............ G08G 1/161 (2013.01); G01S 5/0072 (2013.01); G01S 7/4004 (2013.01); G01S 13/931 (2013.01); G08G 1/165 (2013.01); *G01S 13/867* (2013.01); *G01S 17/936* (2013.01); *G01S 2013/936* (2013.01)

(58) Field of Classification Search
CPC ............ G01S 2013/936; G01S 17/936; G01S 5/0072; G01S 7/4004; G01S 13/867; G01S 13/931; G08G 1/161; G08G 1/165
See application file for complete search history.

(56) References Cited

U.S. PATENT DOCUMENTS

| 5,635,844 | A | 6/1997 | Takigawa et al. |
|---|---|---|---|
| 6,832,156 | B2 | 12/2004 | Farmer |
| 7,418,346 | B2 | 8/2008 | Breed et al. |
| 7,468,791 | B2 | 12/2008 | Samukawa et al. |
| 7,512,475 | B2 | 3/2009 | Perisho, Jr. et al. |
| 2008/0236181 | A1 | 10/2008 | Zhu et al. |
| 2011/0040481 | A1 | 2/2011 | Trombley et al. |
| 2011/0106442 | A1* | 5/2011 | Desai ............... G01S 5/0072 701/532 |
| 2011/0178710 | A1* | 7/2011 | Pilutti et al. ............ 701/301 |

OTHER PUBLICATIONS

Roeckl, M. et al., "V2V Communications in Automotive Multi-sensor Multi-target Tracking," Inst. of Communications and Navigation, German Aerospace Center, Vechicular Technology Conference, 2008, 5 pgs.

* cited by examiner

*Primary Examiner* — Yuen Wong
(74) *Attorney, Agent, or Firm* — Frank MacKenzie; Brooks Kushman P.C.

(57) ABSTRACT

A system and method for suppressing collision warning in a host vehicle is provided. The system receives position data from a remote vehicle. The host vehicle suppresses a collision warning when a detected stationary object is in a safe-zone based on the remote vehicle position data, thereby preventing false collision warnings.

19 Claims, 3 Drawing Sheets

FALSE WARNING SUPPRESSION IN A COLLISION AVOIDANCE SYSTEM

TECHNICAL FIELD

The disclosure relates to a method and system for false event suppression of stationary objects in a collision avoidance system.

BACKGROUND

Many vehicles are equipped with sensors and electronics that together help create a collision warning or collision avoidance system. As a vehicle approaches a target which could potentially cause a collision, the sensors receive information about the relationship of the vehicle's position to the target and issue a warning to the driver.

In vehicular collision warning systems, the occurrence of false events has the potential to lead to annoyance or even an unsafe situation for the driver of the vehicle. For example, if the driver of the vehicle is constantly getting warnings that are not clearly related to a threatening situation, then this could quickly prove to be annoying and cause the driver to lose confidence in the system.

One example of a collision avoidance system is disclosed in U.S. Patent Publication No. 2011/0040481.

SUMMARY

In one embodiment, a warning suppression method for a host vehicle is provided. The method includes receiving position data from a remote vehicle. The host vehicle suppresses a collision warning when a detected stationary object is in a safe-zone based on the remote vehicle position data, thereby preventing false collision warnings.

In another embodiment, the method includes detecting the stationary object with a host vehicle sensor.

In another embodiment, the method includes determining a host vehicle position when the stationary object is detected.

In another embodiment, the method includes receiving the collision warning based on a collision system sensor signal.

In another embodiment, the method includes allowing the collision warning if the stationary object is not within the safe-zone.

In another embodiment, the method includes monitoring collision threat information of the host vehicle. The host vehicle compares the collision threat information to the safe-zone.

In one other embodiment, a host vehicle collision warning system is provided. The collision warning system includes a vehicle controller for a host vehicle. The controller is configured receive a collision threat and path data from a remote vehicle. The controller suppresses a collision warning if the collision threat is in a safe-zone based on the remote vehicle path data, thereby preventing false collision warnings.

In another embodiment, in the controller is also determines a host vehicle position when the collision threat is received.

In another embodiment, the host vehicle position data includes coordinate data. Likewise, the path data includes a plurality of transmitted coordinate positions of the remote vehicle.

In another embodiment, the position data comprises a plurality of position data of the remote vehicle.

In another embodiment, the position data comprises an absolute position data, a heading data, a vehicle length data and a vehicle width data of the remote vehicle.

In another embodiment, the controller allows the collision warning if the collision threat is not within the safe-zone.

In one other embodiment, a host vehicle collision warning system is provided. The vehicle collision warning system includes a collision detection sensor. The vehicle collision warning system also includes a receiver for receiving vehicle-to-vehicle communications. A controller in communication with the sensor and the receiver receives a collision threat and path data from a remote vehicle. The controller suppresses a collision warning in the host vehicle if the collision threat is in a safe-zone based on the remote vehicle path data, thereby preventing false collision warnings.

In another embodiment, the sensor comprises a forward-looking device including at least one of a camera, radar, and lidar.

In another embodiment, the collision warning system includes a global positioning system (GPS) device to determine a position of the host vehicle.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Often times, the root cause of the false event is that a non-vehicle object that is sensed as a valid target by the collision avoidance system and is then reacted upon. Collision avoidance systems have an easier time identifying moving objects as false targets based on the host vehicle speed and the relative speed to the target. With the speed information, identification and rejection of false moving targets becomes much easier. However, rejecting false stationary targets is more difficult. Collision warning systems have a hard time discriminating between a vehicle and other false stationary targets because the stationary targets have no speed so there is no longer an obvious characteristic distinguishing it from a vehicle. All of a sudden objects like berms, man hole covers, trees and poles all resemble valid targets to the collision avoidance system. It is useful to reduce the instances of false positives if possible, because alarms that are unnecessary can be distracting to the driver.

Figure 1:
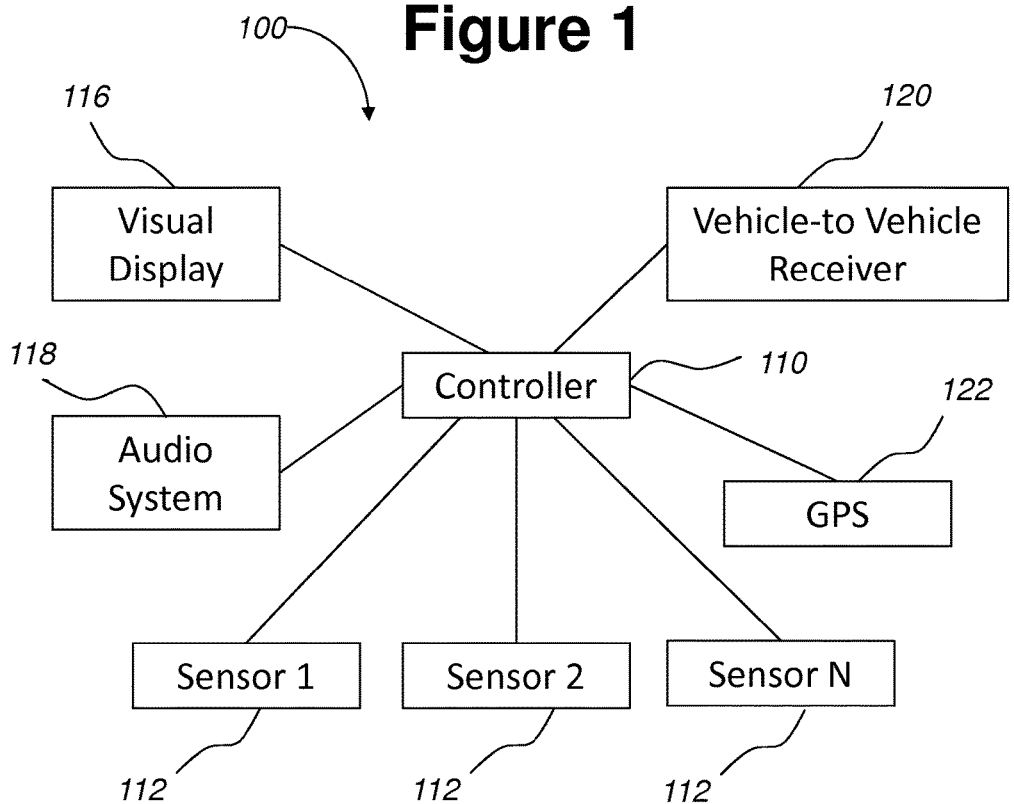
FIG. 1 is a schematic illustration of a collision warning system provided on a vehicle, according to an embodiment.

FIG. 1 is a schematic illustration of a collision warning system (CWS) 100 that can be provided to a vehicle. As shown, the CWS 100 includes a microprocessor 110 that is operable to process instructions to and from various components of the CWS 100. This microprocessor 110 could be a dedicated processor or the CWS 100 could share a processor with other vehicle-based systems.

The CWS 100 may also be provided with one or more vehicle-based sensors 112. The sensors 112 may include, but are not limited to, radar, laser systems such as lidar, cameras or any other suitable sensing apparatus. For example, a camera or radar system can detect the presence of an obstacle within a projected possible path of a vehicle. As the vehicle approaches the obstacle, additional information about the positioning, size, etc of the obstacle can be gathered by vehicle sensors 112. If the vehicle's current heading and speed makes a collision with the object likely or possible, a warning can be given to the driver through a visual display 116 or audio system 118 in communication with the microprocessor 110.

In the embodiment illustrated in FIG. 1, the CWS 100 is also provided with a communications system 120 such as a vehicle-to-vehicle (V2V) communication system. The CWS 100 may wirelessly communicate with other vehicles regarding their status. Various types of V2V communication systems are know to those of ordinary skill in the art that can be used for vehicles to send pertinent information back and forth to each other. For example, V2V information may be transmitted over a radio frequency. Another example of V2 communication system is Dedicated Short Range Communication (DSRC). V2V broadcast messages include information on surrounding vehicle range, range rate, heading, position, speed and acceleration/deceleration, etc. that can be used in a controller algorithm or CWS 100. V2V communication systems can provide driving information about multiple vehicles and can also provide greater range of detection. The communications system 120 can communicates with a remote network or server and retrieve remote information for processing by the microprocessor 110 for rejecting false stationary targets by utilizing vehicle-to-vehicle communications data. Position tracks of surrounding vehicles that are equipped with V2V communications systems can be monitored to create zones of roadway have been driven over in the recent past.

By compiling communications data from other vehicles with V2V communication systems, a map of zones without stationary objects may be created. If the host vehicle's CWS 120 subsequently detects a stationary target through one of the sensors 122, the position of the target can be cross referenced to these zones. If the position of the target falls within an area that has just been driven over by the remote vehicle with a V2V communication system, it can be inferred that the target is then a false target, such as a man hole cover or an overhead sign.

The CWS 100 may also be equipped a global positioning system (GPS) 122. The GPS 122 can be used to record the location of the host vehicle when an object is detected. It can also be used in combination with stored map data to determine the vehicle's position, or vehicle heading on a particular road as a detected obstacle is approached.

The CWS 100 provides a way of identifying zones of roadway that are highly unlikely to contain valid stationary obstacles by monitoring the path histories, positions, headings and velocities of surrounding vehicles that are equipped with a vehicle to vehicle communications system. These zones will be referred to as safe-zones without stationary objects.

Figure 2:
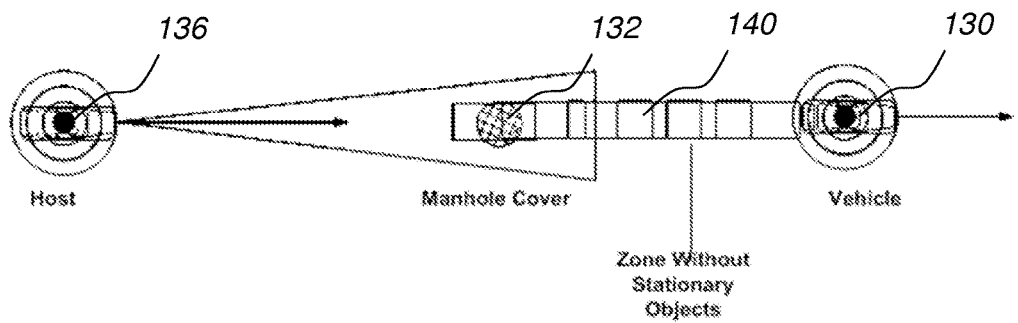
FIG. 2 illustrates a stationary object within a vehicle safe-zone according to an embodiment.

FIG. 2 shows a common roadway scenario where a lead vehicle 130 has just crossed over a manhole cover 132 with a trailing host vehicle 136 following. For a CWS 100, such as a radar based system, there is a possibility that the manhole cover 132 will be detected or sensed as a valid stationary obstacle for the trailing host vehicle 136, especially since manhole covers are difficult to distinguish from vehicles for a radar-based CWS. Subsequently, the CWS 100 in the host vehicle 136 may issue a false warning event.

To prevent false warning events from occurring, the other surrounding vehicles that are equipped with a V2V system can be monitored to determine where they have been in the recent past. From this path history information of remote vehicle 130, the CWS 100 can determine safe-zones 140 without stationary objects on the roadway. Once a safe-zone 140 has been determined, any stationary object 132 that is detected within the safe-zone 140 would be rejected, since it is highly probable that the stationary object in the safe-zone 140 is an invalid object, such as a manhole cover of a metal grate, as shown in FIG. 2.

Figure 3:
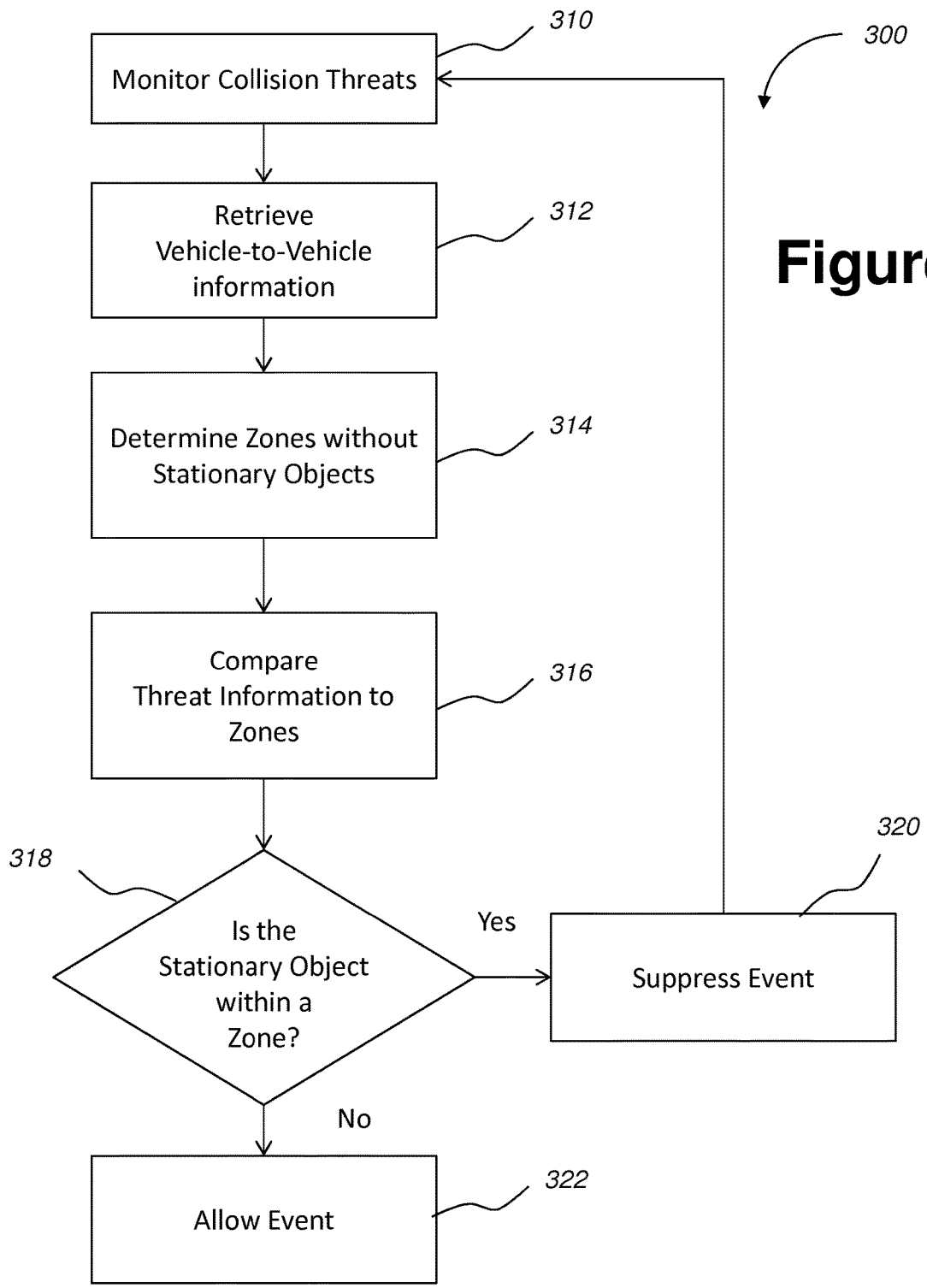
FIG. 3 illustrates a process flowchart for determining if a collision event warning should be suppressed.

FIG. 3 illustrates a method 300 for determining if a collision event warning should be suppressed. As those of ordinary skill in the art will understand, the functions represented by the flowchart blocks can be performed by software and/or hardware. Also, the functions can be performed in an order or sequence other than that illustrated in FIG. 3. Similarly, one or more of the steps or functions can be repeatedly performed although not explicitly illustrated. Likewise, one or more of the representative steps of functions illustrated can be omitted in some applications. In one embodiment, the functions illustrated are primarily implemented by software instructions, code, or control logic stored in a computer-readable storage medium and if executed by a microprocessor based computer or controller such as the controller 110.

The CWS 100 monitors potential collision threats, as represented by block 310. The CWS may determine that a non-vehicle stationary object is causing a threatening situation, by looking at the absolute position of the host vehicle and the range to the object and the azimuth angle to the object, for example. The current absolute position of a potential collision threat, such as a stationary object can be determined as the vehicle monitors for threatening situations in block 310.

Next, the vehicle-to-vehicle data of surrounding vehicles is received, as represented by block 312. The V2V data may include the absolute positions, headings, length and width of the surrounding V2V vehicles. The V2V data may also include path history bread crumbs and width of the surrounding V2V vehicles, for example.

Based on the remote vehicle data in block 312, the safe-zones without stationary objects are determined, as represented by block 314. The safe-zones are determined based on the V2V data of the surrounding vehicles. This will be described in greater detail in FIG. 4 and FIG. 5.

Next, the threat information is compared to the safe-zones, as represented by block 316. The threat information was determined in step 310 and likewise, the safe-zones were determined in step 312.

Next it must be determined if the threatening stationary non-vehicle object is within the safe-zone, as represented by block 318. This is done by comparing the absolute position of the stationary object to the safe-zones. If the detected objects are within any of the safe zones of remote vehicles, the detected object is highly unlikely to be a vehicle collision, so the controller may suppress the event and prevent a collision warning, as represented by block 320.

If the detected object is outside of the safe-zones without stationary objects, then the controller can allow the event, as represented by block 322. If the event is allowed, no determination of the likely hood that the object is a false target can be obtained so the collision avoidance system can warn the driver of a potential threat.

Figure 4:
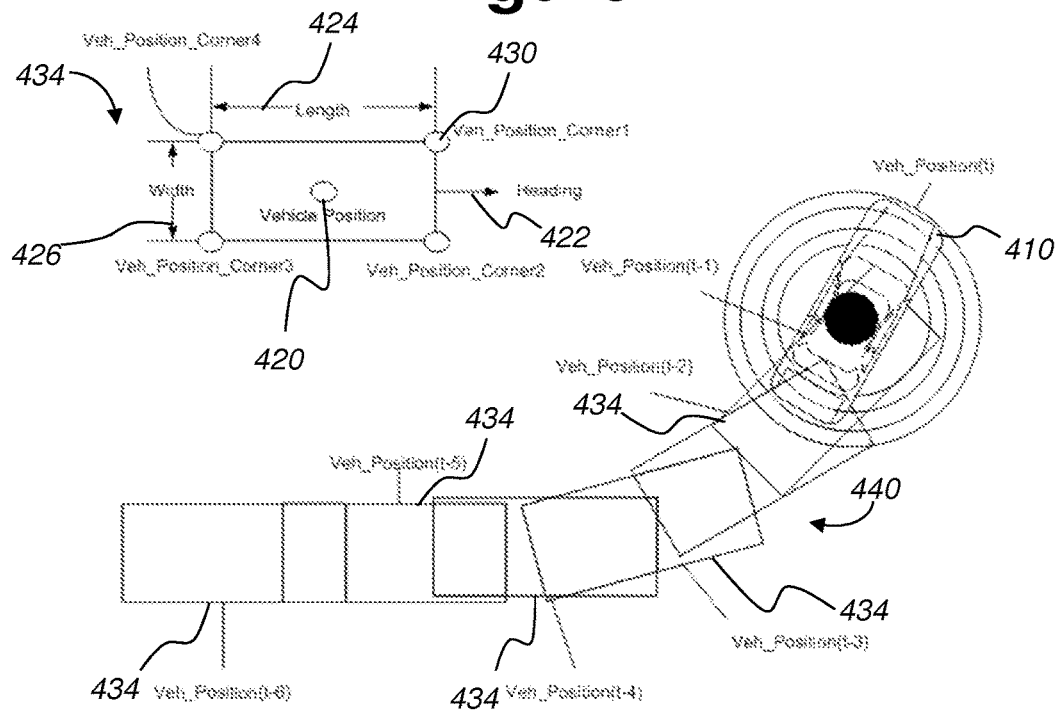
FIG. 4 illustrates a vehicle safe-zone as shown in FIG. 2 according to one embodiment.
Figure 5:
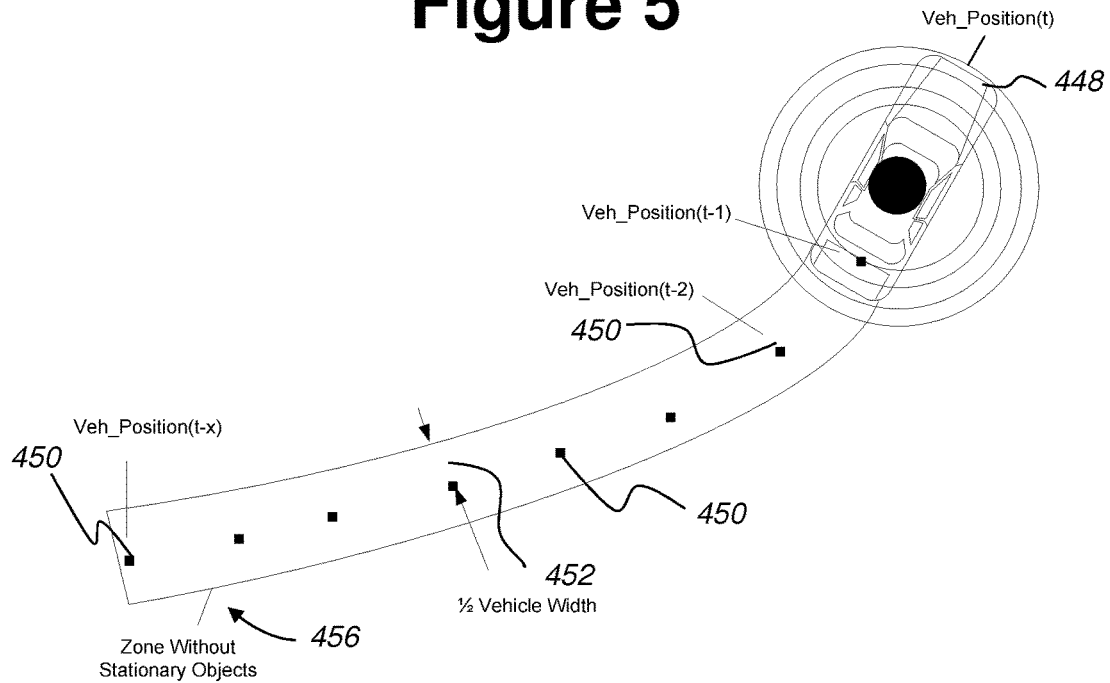
FIG. 5 illustrates a vehicle safe-zone as shown in FIG. 2 according to another embodiment.

Turning now to FIGS. 4 and 5, the method of determining safe-zone of a remote vehicle 410 is illustrated. In FIG. 4, the safe-zone is determined by using the position 420, the heading 422, the length 424 and width 426 of the remote vehicle 410 to determine the four corners 430 of the remote vehicle 410 at any moment as gathered in vehicle-to-vehicle data. The four corners define a bounding box 434 of a zone free of stationary objects for the current moment. These bounding boxes 434 are then maintained for a specified period of time, so a number of sample times, such that each for each sample time a new box 434 is drawn. Overtime, the compilation of bounding boxes 434 defines the safe-zone 440 without stationary objects, as shown in FIG. 4. The safe-zone 440 without stationary objects illustrated in FIG. 4 defines a geometric-shaped trajectory of the remote vehicle 410.

FIG. 5 illustrates another embodiment for determining zones that are free of stationary objects. Like in FIG. 4, the safe-zone is determined by using the position 420, the heading 422, the length 424 and width 426 of the remote vehicle at any moment as gathered in vehicle-to-vehicle data. The path history breadcrumbs 450 of the remote vehicle 448 represent where the remote vehicle 448 has been. Half the width 452 of the vehicle is applied to either side of the breadcrumb 450 at a current moment. The safe-zone 256 is defined when the breadcrumbs 450 and vehicle width 452 are then maintained for a duration of time. The safe-zone 256 without stationary objects illustrated in FIG. 5 defines a smoothed trajectory of the remote vehicle 448.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A warning suppression method comprising: by a host-vehicle controller:
receiving position data from a remote vehicle;
creating a safe-zone based on the position data, indicative of a location the remote vehicle has driven through;
detecting a stationary object; and
suppressing an audio or visual alert in a host vehicle when the stationary object is in the safe-zone by comparing a position of the stationary object to the safe-zone preventing false alerts and reducing driver distraction.

2. The method of claim 1 further comprising detecting the stationary object with a host vehicle sensor.

3. The method of claim 2 further comprising determining a host vehicle position when the stationary object is detected.

4. The method of claim 1 further comprising receiving the audio or visual alert based on a collision system sensor signal.

5. The method of claim 1 further comprising allowing the the audio or visual alert when the stationary object is not within the safe-zone.

6. The method of claim 1 wherein the position data comprises a plurality of position data of the remote vehicle.

7. The method of claim 1 wherein the position data comprises a transmitted coordinate position of the remote vehicle.

8. The method of claim 1 wherein the position data comprises an absolute position data, a heading data, a vehicle length data and a vehicle width data of the remote vehicle.

9. The method of claim 1 further comprising:
monitoring collision threat information of the host vehicle; and
comparing the collision threat information to the safe-zone.

10. The method of claim 1 wherein the remote vehicle position data comprises coordinate data.

11. A host vehicle collision warning system comprising:
a vehicle controller for a host vehicle, the controller being configured to:
receive a collision threat;
receive path data from a remote vehicle;
create a safe-zone, based on the path data, indicative of locations the remote vehicle has been; and
suppress an audio or visual alert in the host vehicle when the collision threat is in the safe-zone by comparing a position of the collision threat to the safe-zone to prevent false alerts and reduce driver distraction.

12. The collision warning system of claim 11 wherein the controller is further configured to determine a host vehicle position when the collision threat is received.

13. The collision warning system of claim 11 wherein the path data comprises a plurality of transmitted coordinate positions of the remote vehicle.

14. The collision warning system of claim 11 wherein the path data comprises an plurality of remote vehicle position data including at least one of an absolute position data, a heading data, a vehicle length data and a vehicle width data of the remote vehicle.

15. The collision warning system of claim 11 wherein the controller is further configured to allow the audio or visual alert when the collision threat is not within the safe-zone.

16. The collision warning system of claim 11 wherein the collision threat is based on a collision system sensor disposed on the host vehicle.

17. A host vehicle collision warning system comprising:
a collision detection sensor;
a receiver for receiving vehicle-to-vehicle communications; and
a controller in communication with the collision detection sensor and the receiver, the controller being configured to:
receive a collision threat via the collision detection sensor;
receive path data from a remote vehicle via the receiver;
create a safe-zone, based on the path data, indicative of locations the remote vehicle has been; and
suppress an audio or visual alert in a host vehicle when the collision threat is in the safe-zone by comparing a position of the collision threat to the safe-zone to prevent false alerts and reduce driver distraction.

18. The collision warning system of claim 17 wherein the collision detection sensor comprises a forward-looking device including at least one of a camera, radar, and lidar.

19. The collision warning system of claim 17 further comprising a global positioning system (GPS), wherein the controller is further configured to determine a position of the host vehicle based on data from the GPS device.

* * * * *